June 13, 1933.   D. F. SPROUL   1,914,051
DRAFT GEAR
Filed Feb. 17, 1930   3 Sheets-Sheet 1

Inventor
Donald F. Sproul
By Gillson, Mann &c
Attys.

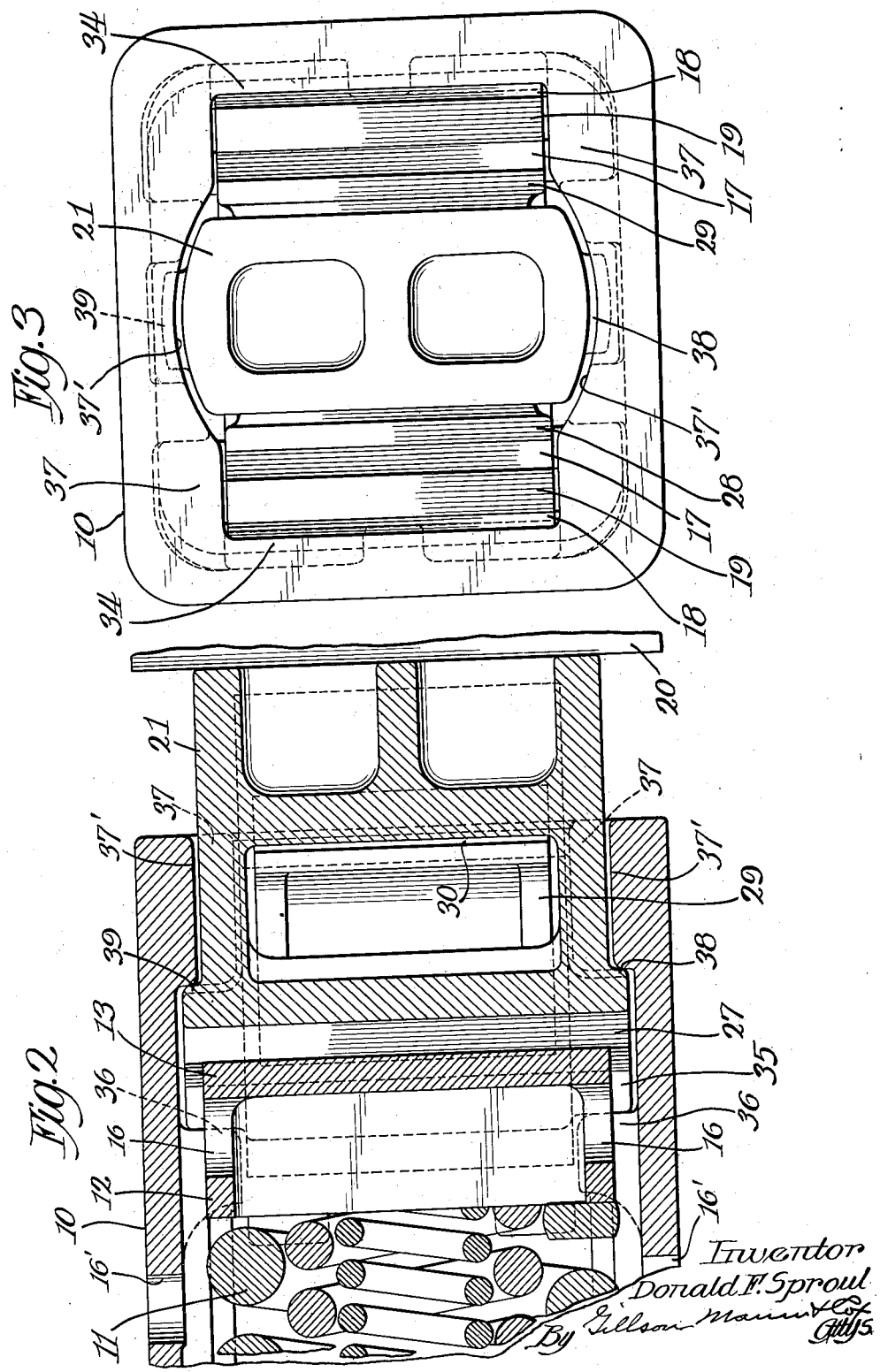

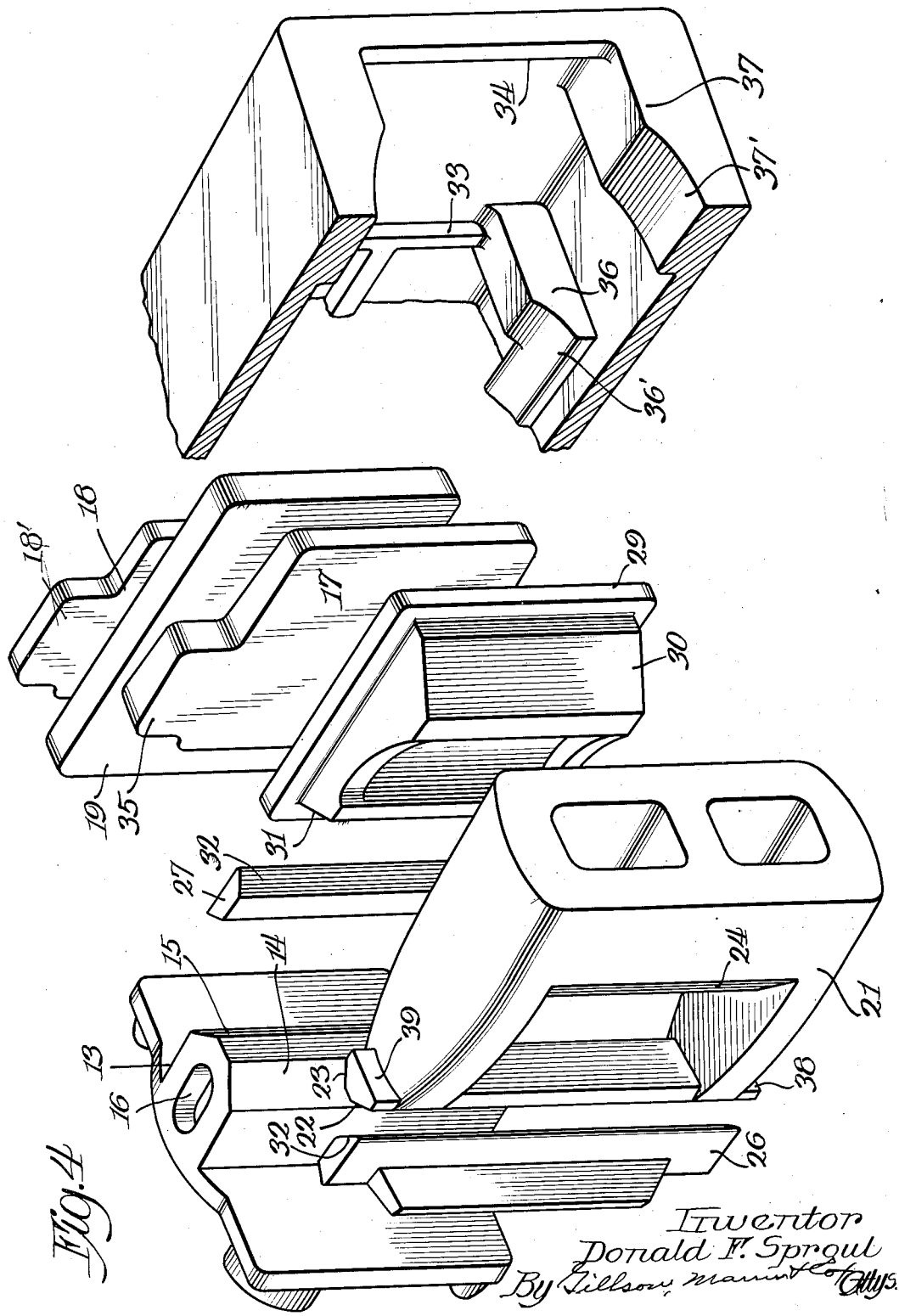

Patented June 13, 1933

1,914,051

UNITED STATES PATENT OFFICE

DONALD F. SPROUL, OF CHICAGO, ILLINOIS, ASSIGNOR TO CARDWELL WESTINGHOUSE COMPANY, A CORPORATION OF DELAWARE

DRAFT GEAR

Application filed February 17, 1930. Serial No. 429,095.

The invention relates especially, but not exclusively, to draft gears of the friction plate type and has for its principal object the provision of means integral with the casing within which the friction plates are housed for holding the elements of the gear in assembled relation.

Other and further objects and advantages of the gear are pointed out in connection with the description.

In the drawings illustrating a preferred form of construction,

Fig. 2 is a detail section on the line 2—2 of Fig. 1;

Fig. 3 is an end view of the gear looking toward the open end of the casing; and Fig. 4 shows details in perspective of the various elements of the gear, a portion only of the casing being shown.

Figure 1:
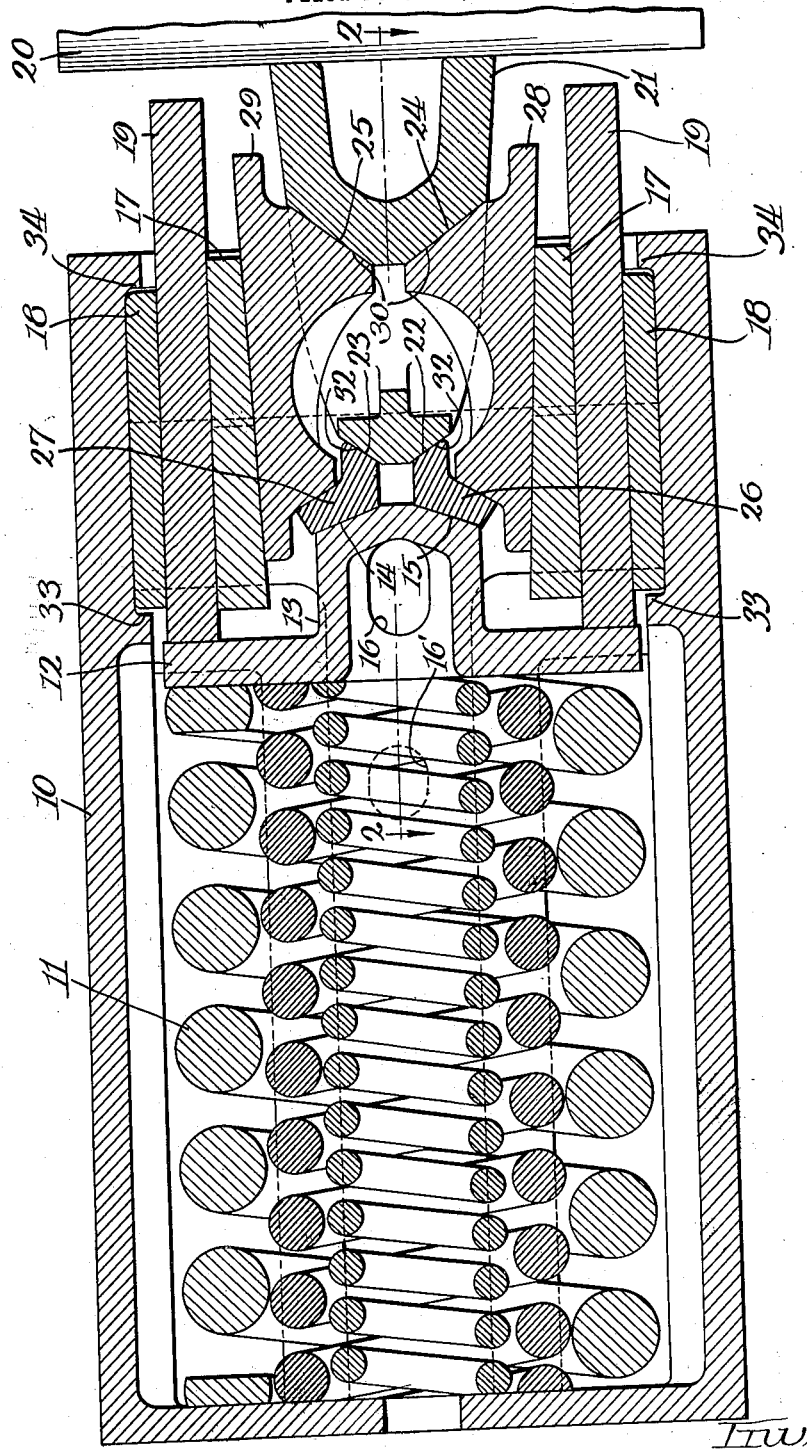
Fig. 1 is a central plan section of the gear.

The disclosed embodiment of the improved gear comprises a chambered casing 10, the closed end of which is adapted to engage, as a follower, draft or buffing lugs. Within the casing, spring elements 11 are housed, there being shown a set of three concentrically disposed helical springs. These springs react between the closed end of the casing and a spring seat 12 having a forwardly projecting central stem 13, the end of which is provided with a pair of wedging faces 14, 15 which are inclined rearwardly and outwardly (the open end of the gear being regarded as its forward end) at an obtuse angle to the axis of the gear. This stem is also provided with a transverse aperture 16 to receive a bolt (not shown) which may be inserted through suitable apertures 16' in the casing for the purpose of holding the springs somewhat compressed during the assembling or disassembling of the gear, to facilitate the insertion or removal of the remaining elements, such bar forming no part of the operative mechanism and being used only temporarily.

Two groups of intercalated friction plates are used, the number of plates in each group being optional, there being shown two anchored plates 17, 18, and one floating plate 19. The anchored plates are wholly enclosed within the casing forward of the spring seat 12. The floating plates are of greater length than their companions and project in both directions beyond them, being normally in engagement with the spring seat and extending outwardly beyond the end of the casing, but not a sufficient distance to engage the plate follower 20 which seats against one pair of sill lugs. At least one of the anchored plates of each group is tapered toward its forward or outer end.

Interposed between the two groups of friction plates is a group of wedging elements comprising a thrust member 21 normally seated against the follower 20 and projecting into the casing to within a short distance of the stem 13 of the spring seat and being provided at its inner end with a pair of backwardly facing shoulders 38, 39 at its edge margins and with a pair of inwardly and forwardly inclined wedge faces 22, 23, and intermediate of its ends with a pair of similarly inclined wedging faces 24, 25. Interposed between the stem 13 and the inner end of the thrust element 21 are a pair of wedging bars 26, 27 having faces corresponding to and engaging the wedge surfaces 14, 15 and 22, 23. A pair of friction shoes 28, 29 engage the inner faces of the two groups of friction plates, as shown having bearing against the tapered anchored plates 17. Each of these shoes is provided with a pair of wedging faces 30, 31, the former being adjacent the outer end of the shoe and cooperating with one of the outer wedge faces of the thrust element 21 and consequently being inwardly and forwardly inclined, and the latter being forwardly and outwardly inclined and cooperating with correspondingly shaped wedging faces as 32 on the bars 26, 27.

Upon compression of the gear, the thrust element 21 moves, relatively, into the casing, carrying with it the shoes 28, 29 and the bars 26, 27, the spring seat 12 being moved inwardly against the resistance of the springs; the wedging faces of the thrust element, the shoes and the wedge bars being quite obtuse but slight wedging action is developed, the shoes, however, being urged against the friction plates.

As the shoes slide along the faces of the adjacent friction plates, they are wedged laterally inward because of the taper of one of the plates, thereby lengthening the columns interposed between the plate follower and the stem of the spring seat, this lengthening being due to the cooperating wedge faces as 25 and 30, 31 and 32, and in part to the laterally inward movement of the bars 26, 27. This lengthening of the columns moves the spring seat away from the ends of the floating plates 19. As the compression continues the plate follower 20 engages the outer ends of the plates 19, moving them backwardly relatively to the anchored plates 17, 18. The construction disclosed provides for a high degree of frictional resistance to the compression of the gear, though a comparatively small number of elements are required and these may be sufficiently massive to insure adequate strength.

Upon release, the wedging elements are moved outwardly relatively to the casing, by the expansion of the spring, jamming being avoided by reason of the tapered form of the plates 17, while a too abrupt release is guarded against by the laterally outward wedging action upon the shoes. As the release movement progresses, the spring seat comes into engagement with the inner ends of the floating plates 19 and carries them back to the normal position shown in Fig. 1.

The outer anchored plates 18 are seated between a pair of shoulders 33, 34 formed integrally on the casing walls against which they seat. In order to permit an entry into the casing of the spring 11 of ample size, the ribs providing the shoulders 36, 37 are centrally reduced in thickness, as indicated at 36', 37'. The inner anchored plates 17 are provided with lateral lugs as 35 which enter between integral shoulders 36, 37 formed upon the walls of the casing against which the edges of these plates engage.

In assembling the gear, the casing 10 is set upright on its closed end, and the springs and the spring seat 12 are inserted. Pressure is applied to the spring seat to compress the springs until the apertures 16, 16' register, whereupon a bar is inserted through these apertures to temporarily hold the springs under compression. The bars 26 and 27 are dropped into place and roughly positioned. The plates 18 are now inserted and properly positioned. In order to prevent these plates from accidently dropping down upon the spring seat as the assembling proceeds, they are preferably provided with lateral lugs 18' which engage the shoulders 36. The plates 17 are now inserted, one of them being properly positioned except that it is forced into contact with one of the plates 18, the companion plate 17 being cross-wise of the casing, bringing it approximately parallel with the spring seat.

The thrust element 21 is now entered into the casing, and inasmuch as it is provided with laterally projecting lugs 38, 39 for engaging back of the shoulders 37, it is necessarily turned on its longitudinal axis to permit these lugs to pass the shoulder and is then turned back to proper position, bringing its edge portions in line with the reduced portions 36' 37' of the ribs carrying the shoulders 36, 37. Preferably, the edge margins of the element 21 are rounded as shown in order that they may contact or bear upon the reduced portions of the ribs.

The plate 17 which had been tilted is now brought into proper position, bringing its lugs 35 between the shoulders 36, 37, and the shoes 28, 29 are inserted, the bars 26, 27 being now accurately positioned to bring them into engagement with the wedging faces of the shoes and of the element 21. The plates 17 being now moved into bearing contact with the shoes, space is left between them and the plates 18 for the insertion of the plates 19. The temporary restraining bar being now removed, the springs expand and all of the parts are forced into normal position as shown in Fig. 1, and are securely bound in place so that the gear may be shipped from the factory without danger of displacement of any of its elements.

The gear may, of course, be disassembled for the purpose of repair of replacements, first placing the springs under compression and retaining them by the insertion of a temporary bar through the aperture 16, 16' whereupon the floating plates 19 may be readily withdrawn and the other elements easily removed.

I claim as my invention:—

1. In a draft gear, in combination, a chambered follower having on two of its opposite sides internal transverse ribs adjacent its open end, such ribs being of reduced width midway of their ends, a set of friction elements housed within the chamber and comprising a thrust element of a width to fit between the reduced portions of the ribs, two opposite sides of such element being transversely curved and longitudinally approximately parallel, shoulders projecting outwardly from the inner ends of such curved sides and engageable with the named ribs, and spring means interposed between the friction elements and the closed end of the follower.

2. In a draft gear, in combination, a chambered follower having oppositely disposed apertures in two of its side walls for receiving a retaining bar, a floating spring seat, an expansion spring interposed between the closed end of the chamber and the seat, the named apertures being located between the position of the seat and such closed end, instanding transverse ribs on two opposite sides of the chamber adjacent its open end, a set of friction elements housed within the chamber and comprising a thrust element having lateral shoulders adjacent its inner end for engaging the ribs, and intercalating friction plates, the parts being so proportioned that in assembling the gear one of such plates may be turned between the inner end of the thrust member, when positioned, and the spring seat, when held by the retaining bar, from a position transverse to the axis of the gear to a position parallel with such axis.

In testimony whereof I affix my signature.

DONALD F. SPROUL.